Jan. 26, 1954

E. A. WEISHAAR 2,667,028

WAGON LOADING ATTACHMENT FOR COMBINES

Filed April 13, 1950

Inventor
Enrich A. Weishaar

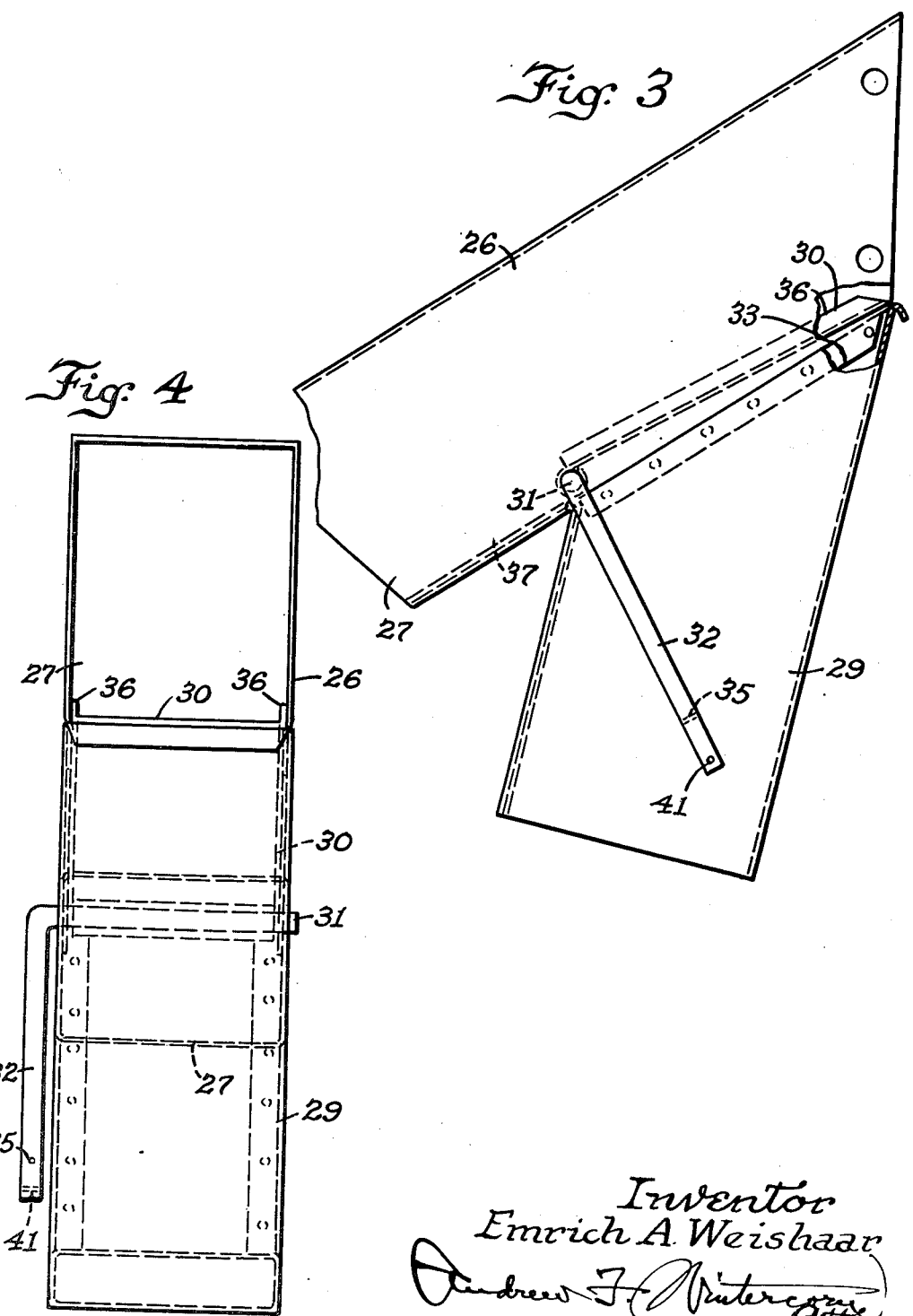

Patented Jan. 26, 1954

2,667,028

UNITED STATES PATENT OFFICE 2,667,028

WAGON LOADING ATTACHMENT FOR COMBINES

Emrich A. Weishaar, Ashton, Ill.

Application April 13, 1950, Serial No. 155,696

4 Claims. (Cl. 56—473.5)

This invention relates to a new and improved wagon loading attachment designed for easy application to existing harvester-threshers or combines.

In harvesting standing grain with a combine it was the practice, prior to my invention, to catch and store the freshly cut and threshed grain in a bin, and unload the grain from the bin into wagons spotted as well as can be around the field in anticipation of this, the combine being stopped for each unloading operation when the bin is filled. It is, therefore, the principal object of my invention to avoid the time loss involved in that old procedure by providing an attachment whereby the grain can be discharged directly into a trailing wagon as it is harvested, the grain being diverted into the bin only occasionally by the opening up of a rope-controlled bypass gate or baffle plate provided for that purpose and operable from the tractor seat, as, for example, when unhitching a filled wagon and hitching another wagon in place of it, also in turning corners sharply with a narrow box wagon at which time grain is otherwise apt to be thrown onto the ground, and when the bin is being filled as a reservoir, and in the harvesting of small seeds or grains not bulky enough to require a wagon.

The attachment comprises an elongated conveyor tube or conduit extending from a point over the bin and under the grain elevator discharge rearwardly over the combine body to a point over the wagon box and having a power operated auger working the full length thereof to convey the grain to the wagon, the attachment including an inverted generally L-shaped chute, one leg of which extends from the grain elevator discharge to the intake end of the grain conveyor conduit and the other leg of which is directed downwardly into the bin so that a gate or baffle plate pivoted at the junction of the arms of the L and normally spring-pressed to one extreme position closing the entrance to the last named downwardly directed leg of the L-shaped chute, will serve when operated to the other extreme position to stop the discharge of grain into the conveyor conduit immediately and divert the grain directly into the bin so long as the gate is held open.

The invention is illustrated in the accompanying drawings, in which—

Figs. 3 and 4 are a side and front view, respectively, of the V-chute.

The same reference numerals are applied to corresponding parts throughout the views.

Figure 1:
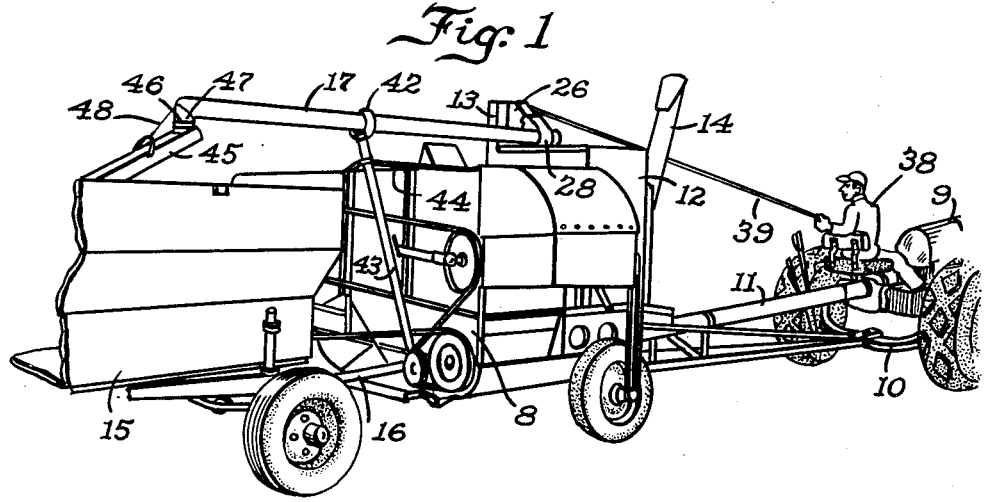
Fig. 1 is a perspective view from the rear showing enough of the combine and the leading tractor and trailing wagon to enable a good illustration of the wagon loading attachment and showing the way in which the gate or baffle plate in the bypass is operated from the tractor seat to divert the flow of grain into the bin instead of the wagon, when the occasion requires.
Figure 2:
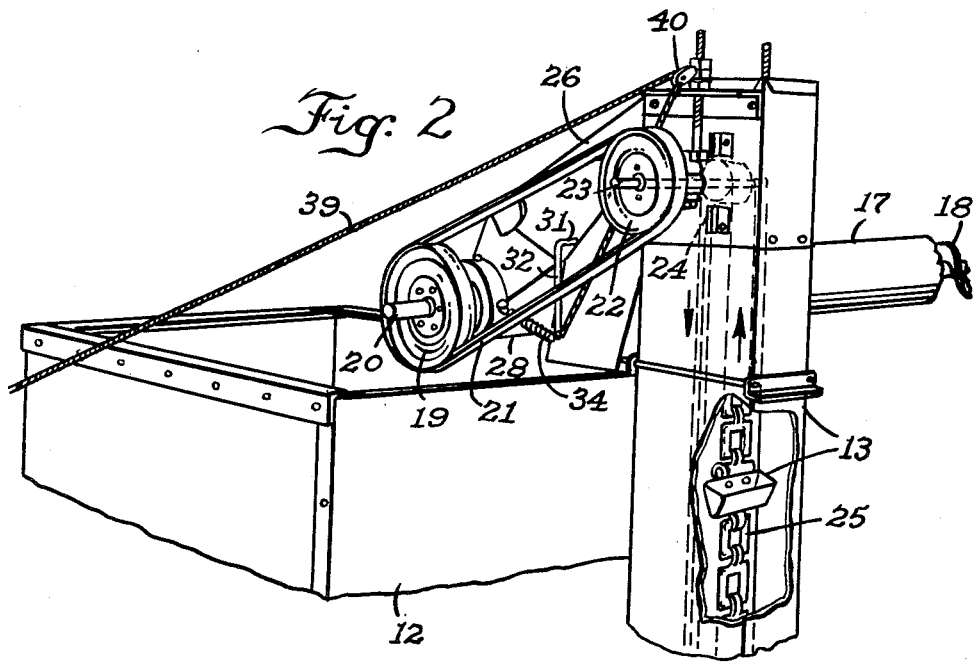
Fig. 2 is a perspective view from the front of the combine showing the bin and the grain elevator and the arrangement of the inverted L-shaped chute between the elevator and the intake end of the grain conveyor conduit, and also the crank for operating the gate or baffle plate and the spring and rope connected therewith.

Referring to the drawings, the reference numeral 8 designates the combine, and 9 the tractor pulling the same, by means of its draw-bar 10, and furnishing the drive through its power take-off, as indicated at 11. 12 is the bin on the front portion of the combine arranged to receive the freshly threshed grain discharged from an endless-belt bucket type grain elevator 13. An unloading auger type conveyor 14 communicates with the hopper bottom of the bin 12 and is adapted to be thrown into operation at will and swung sidewise to an unloading position to transfer grain from the bin to a wagon placed alongside the combine. However, in accordance with my invention, the wagon 15 to be filled with grain is hitched behind the combine 8, as shown at 16, and an auger type conveyor 17 is provided extending from a point over the bin 12 and under the discharge end of the grain elevator 13 rearwardly over the combine 8 to a point over the wagon box 15 and having a power operated auger 18 working the full length thereof to convey the grain to the wagon, so that, instead of harvesting only a bin full and stopping periodically to empty the grain into a wagon, the grain is delivered into the wagon as it is harvested and a wagon full is harvested before there is any necessity for stopping the combine, and then only long enough to hitch another wagon onto the combine, thereby saving usually about 25% of harvesting time, reckoning in relation to the old procedure. The auger 18 may be driven continuously in any suitable or preferred manner. I have shown a pulley 19 suitably fixed on the projecting inner end of the auger shaft 20, connected by a belt 21 with a pulley 22 provided on and suitably fixed to the idler shaft 23 at the upper end of the conveyor 13, this shaft carrying a sprocket, as indicated in dotted lines at 24, which meshes with the links of belt 25 forming a part of the conveyor, whereby the belt, which is suitably driven at its lower end from the power take-off of the tractor, transmits drive to shaft 23. The wagon loading attachment includes an inverted L-shaped chute 26, one leg 27 of which extends from the grain elevator discharge to the intake end 28 of the grain conveyor conduit, and the other leg 29 of which constitutes a bypass and is directed downwardly into the bin 12, and a sheet metal gate or baffle plate 30, which is pivoted at the junction of the arms of the L by rigid connection with the bearing axle portion 31 of a crank 32, that is rotatably mounted in registering holes provided in the opposed side walls of the chute, is normally spring-pressed to one extreme position closing the entrance 33 to the downwardly directed leg 29 of the chute, so that grain discharged from elevator 13 is conducted over gate 30 to conveyor conduit 17 for discharge into wagon 15. A coiled tension spring 34 anchored at one end to the conduit 17 has its other end attached to the free end portion of crank 32, in hole 35, to hold the gate 30 normally in the down position shown in Fig. 3. The flanges 36 on the marginal edge portions of gate 30 lend stiffness and strength thereto and help to direct the grain discharged over the gate into the passage 37 in the leg 27 leading to conveyor 17. Whenever the flow of grain to the wagon 15 is to be interrupted, as for any one of the reasons enumerated before, the driver 38 of the tractor merely pulls a rope 39 to swing the gate 30 upwardly so as to divert the grain directly into the bin 12 through bypass 29 so long as the gate is held open against the action of the return spring 34. The rope 39 extends from the tractor seat rearwardly and upwardly to and over a pulley 40 carried on the upper end of elevator 13 and down to the cank 32 to which it is connected in a hole 41 provided in the free end. In passing, it will be observed in Fig. 1 that conduit 17 is supported intermediate its ends by a collar 42 carried on the upper end of a prop 43 suitably attached at its lower end to the back of the combine 8 and braced near its upper end, as at 44, from the top of the combine. The conduit 17 is, of course, otherwise supported by its connection at the intake end 28 with the shell of elevator 13, through chute 26.

A discharge spout 45 is swivelled as by a ring 46 on a downwardly extending cylindrical neck 47 provided on the discharge end of conduit 17. A sling 48 extends between the end of conduit 17 and points on diametrically opposite sides of the spout intermediate the ends thereof for support thereof in any position of swivel movement within a range of about 60°, which is more than ample for the present purposes, namely, to follow the lateral shifting of the wagon box in relation to the conduit 17 coming as a result of the combine making a turn in one direction or another, whereby to keep the stream of grain discharging from the spout properly directed to go into the wagon box and not alongside it.

It is believed the foregoing description conveys a good understanding of the objects and advantages of my invention. The appended claims have been drawn to cover all legitimate modifications and adaptations.

I claim:

1. The combination with a combine, of a substantially vertical elevator on said combine for carrying threshed grain from said combine, a bin adjacent said elevator supported by said combine, a substantially horizontal conveyor conduit for conducting grain from said elevator, a power-operated auger in said conduit, an inverted generally L-shaped chute having one leg extending laterally and downwardly between the elevator and intake end of said conduit and auger and having the other leg directed downwardly into said bin, and a manually oscillatable baffle plate inside said chute pivoted at the junction of the arms of the L and swingable from one extreme position closing the entrance into the downwardly directed leg of said chute to another extreme position disposed crosswise in the laterally and downwardly directed leg of said chute adjacent to and directing grain into the entrance in the downwardly directed leg of said chute.

2. The combination, with a combine, of a substantially vertical elevator on said combine for carrying threshed grain from said combine, a bin adjacent said elevator supported by said combine, a substantially horizontal conveyor conduit for conducting grain from said elevator, a power-operated auger in said conduit, an inverted generally L-shaped chute having one leg extending laterally and downwardly between the elevator and intake end of said conduit and auger and having the other leg directed downwardly into said bin, a baffle plate pivoted inside said chute pivoted at the junction of the arms of the L and swingable from one extreme position closing the entrance into the downwardly directed leg of said chute to another extreme position disposed crosswise in the laterally and downwardly directed leg of said chute adjacent to and directing grain into the entrance in the downwardly directed leg of said chute, spring means connected for moving said baffle plate normally to closed position, and manually remotely operable means connected for moving said baffle plate to open position against resistance of said spring means.

3. For use with a combine having a substantially vertical elevator for carrying threshed grain therefrom, a bin adjacent said elevator supported by said combine, a conveyor conduit for conducting grain from said elevator, a power-operated auger in said conduit, an inverted generally L-shaped chute having one leg extending laterally and downwardly between the elevator and intake end of said conduit and auger and having the other leg directed into said bin, and a plate inside said chute pivoted at the junction of the arms of the L to swing from a position closing the entrance into the downwardly directed leg of said chute to another extreme position closing the passage in the laterally and downwardly directed leg thereof and directing grain into the entrance in the downwardly directed leg.

4. For use with a combine having a substantially vertical elevator for carrying threshed grain therefrom, a bin adjacent said elevator supported by said combine, a conveyor conduit for conducting grain from said elevator, a power-operated auger in said conduit, an inverted generally L-shaped chute having one leg extending laterally and downwardly between the elevator and intake end of said conduit and auger and having the other leg directed into said bin, a plate inside said chute pivoted at the junction of the arms of the L to swing from a position closing the entrance into the downwardly directed leg of said chute to another extreme position closing the passage in the laterally and downwardly directed leg thereof and directing grain into the entrance in the downwardly directed leg, a crank connected to the pivoted end of said plate to swing it, spring means connected to said crank tending normally to urge said plate to a position closing the entrance into the downwardly directed leg, and a remotely manually operable pull rope connected to said crank to swing said plate to the other extreme position.

EMRICH A. WEISHAAR.

References Cited in the file of this patent

UNITED STATES PATENTS

| Number | Name | Date |
|---|---|---|
| 1,459,247 | Vilar y Pagos | June 19, 1923 |
| 1,615,334 | MacGregor | Jan. 25, 1927 |
| 1,953,235 | Kelley | Apr. 3, 1934 |
| 2,430,007 | Evans, Jr. | Nov. 4, 1947 |
| 2,496,472 | Huddle | Feb. 7, 1950 |
| 2,533,814 | Karlsson | Dec. 12, 1950 |